US005790009A

United States Patent [19]

Jackson

[11] Patent Number: 5,790,009
[45] Date of Patent: Aug. 4, 1998

[54] THERMOSTAT RESET WITH ADDITIONAL ELECTRICAL SWITCH

[75] Inventor: Mark D. Jackson, Prescott, Canada

[73] Assignee: Black & Decker Inc., Newark, Del.

[21] Appl. No.: 786,011

[22] Filed: Jan. 21, 1997

[51] Int. Cl.$^6$ .................... H01H 37/70; A47G 19/14
[52] U.S. Cl. .................... 337/348; 99/279; 99/280; 219/481
[58] Field of Search .................... 337/348, 333, 337/334, 335, 337, 338, 339, 345, 354, 380, 381, 357; 361/103; 99/473, 281, 280, 468; 236/21 R, 20 R, 89, 91 F, 21 B; 65/162; 219/442

[56] References Cited

U.S. PATENT DOCUMENTS

| | | |
|---|---|---|
| 1,812,162 | 6/1931 | Maple . |
| 2,248,387 | 7/1941 | Rosing et al. . |
| 2,729,716 | 1/1956 | Lee . |
| 2,741,682 | 8/1956 | Schwaneke et al. ............ 337/348 |
| 2,897,321 | 7/1959 | Patti ............ 337/337 |
| 2,952,759 | 9/1960 | Kircher ............ 337/359 |
| 2,987,919 | 6/1961 | Kirby ............ 236/91 F |
| 3,036,178 | 5/1962 | Brackett . |
| 3,081,388 | 3/1963 | Cox . |
| 3,219,783 | 11/1965 | Odson . |
| 3,333,087 | 7/1967 | Manship et al. ............ 219/442 |
| 3,621,434 | 11/1971 | Gerich ............ 337/348 |
| 3,675,178 | 7/1972 | Place ............ 337/348 |
| 3,679,849 | 7/1972 | Zwiep et al. ............ 200/33 R |
| 3,832,667 | 8/1974 | Blanton ............ 337/354 |
| 3,842,380 | 10/1974 | Granson et al. ............ 337/6 |
| 3,924,213 | 12/1975 | Semple ............ 337/130 |
| 4,039,991 | 8/1977 | Bucheister ............ 337/348 |
| 4,118,683 | 10/1978 | Schwarz ............ 337/91 |
| 4,323,871 | 4/1982 | Kamp et al. ............ 337/7 |
| 4,349,806 | 9/1982 | Boulanger ............ 337/343 |
| 4,363,016 | 12/1982 | Unger ............ 337/56 |
| 4,480,246 | 10/1984 | Schmitt ............ 337/348 |
| 4,841,271 | 6/1989 | Purssell ............ 337/320 |
| 5,003,282 | 3/1991 | Boulanger ............ 337/348 |
| 5,157,370 | 10/1992 | Engelbach et al. ............ 337/348 |
| 5,270,799 | 12/1993 | Rose ............ 337/354 |
| 5,404,803 | 4/1995 | Glucksman ............ 99/473 |

Primary Examiner—Leo P. Picard
Assistant Examiner—Anatoly Vortman
Attorney, Agent, or Firm—Barry E. Deutsch

[57] ABSTRACT

An electric coffee maker having a hot water heater, a resettable thermostat, a mechanism for resetting the thermostat, and an electrical switch connected in series with the thermostat. The resetting mechanism has a user actuated button movably mounted to a housing of the coffee maker and a lever connected to the button. The lever moves a plunger of the thermostat when the button is moved by a user. The switch has an actuator located under a portion of the button that is moved by the button, to open the switch, when the button is moved towards a thermostat reset position.

17 Claims, 3 Drawing Sheets

THERMOSTAT RESET WITH ADDITIONAL ELECTRICAL SWITCH

BACKGROUND OF THE INVENTION

1. Field of the Invention

The present invention relates to an electric appliance and, more particularly, to an appliance with a resettable thermostat and a system for use when the thermostat is being reset.

2. Prior Art

Black & Decker (U.S.) Inc. sells electric coffee makers under the catalog No. DCM20WH which includes a hot water heater, a resettable thermostat, and a mechanism for resetting the thermostat. The resetting mechanism has a button slidably mounted to the housing and a lever pivotably mounted between the button and the thermostat. Snap acting thermostatic switches are known, such as seen in U.S. Pat. No. 4,349,806. Trip free manual reset thermostats are also well known in the art as shown in U.S. Pat. Nos. 4,480,246; 4,841,271 and 5,003,282.

SUMMARY OF THE INVENTION

In accordance with one embodiment of the present invention, an electrical appliance is provided comprising a housing, a heater connected to the housing, a resettable thermostat connected to the heater, a mechanism for resetting the thermostat, and an electrical switch. The resetting mechanism includes a user actuated button movably mounted to the housing. The button is movable between a home position and a thermostat reset position. The electrical switch is electrically connected to the thermostat. The switch is actuated directly by the user actuated button when the button is moved towards the thermostat reset position such that the switch is moved to an open position when the thermostat is moved by the resetting mechanism to a reset position.

In accordance with another embodiment of the present invention, an electric coffee maker is provided having a housing, a hot water heater located in the housing, a resettable thermostat connected to the heater, and a mechanism for resetting the thermostat. The resetting mechanism includes a user actuated button movably mounted to the housing. The improvement comprises an electrical switch separate from the thermostat and electrically connected in series with the thermostat. The switch has an actuator that is moved by the user actuated button to open the switch when the button is moved by the user to a thermostat reset position.

In accordance with one method of the present invention, a method of manufacturing an electrical appliance having a hot water heater is provided comprising the steps of connecting a resettable thermostat to the heater; attaching a mechanism to a frame of the appliance for resetting the thermostat; and connecting a switch to the thermostat in electrical series. The switch is connected to the frame separate from the thermostat. The switch has an actuator located to be moved by the resetting mechanism when the resetting mechanism is moved towards a thermostat reset position.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
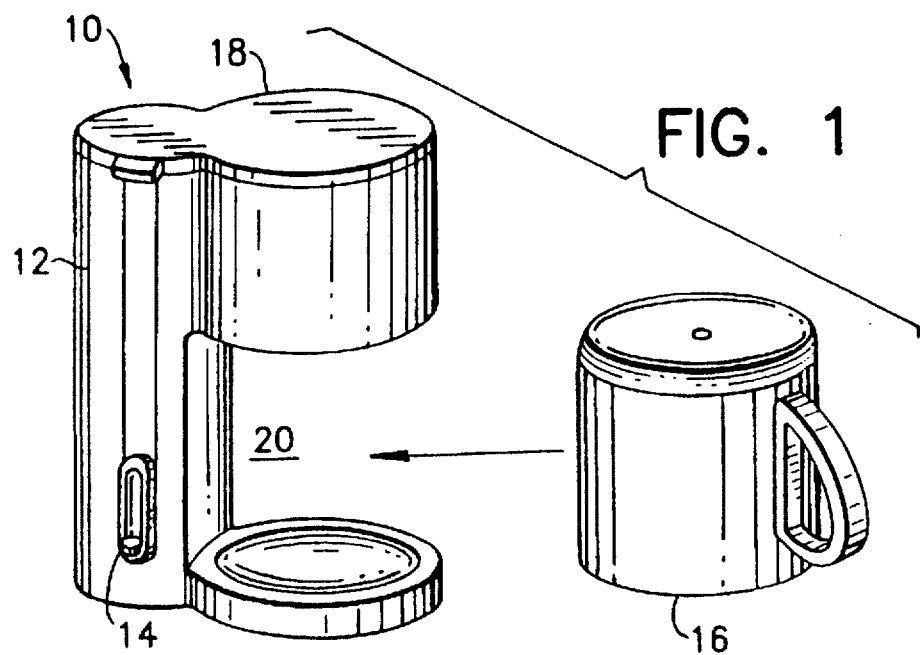
FIG. 1 is schematic perspective view of a coffee maker incorporating features of the present invention.

Referring to FIG. 1, there is shown a perspective view of a coffee maker 10 incorporating features of the present invention. Although the present invention will be described with reference to the single embodiment shown in the drawings, it should be understood that features of the present invention can be embodied in various different forms of alternate embodiments including other types of electrical appliances. In addition, any suitable size, shape or type of elements or materials could be used.

Figure 2A:
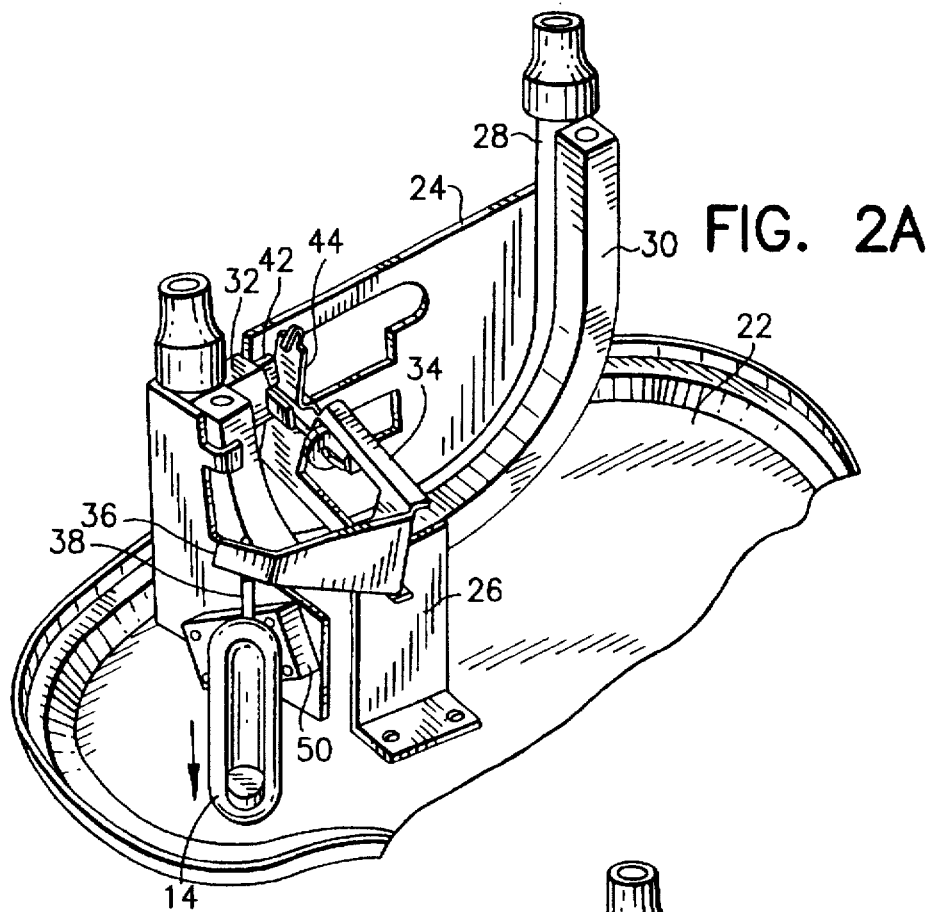
FIG. 2A is a partial perspective view of portions of the coffee maker shown in FIG. 1 with a user actuated button at a first position.
Figure 3:
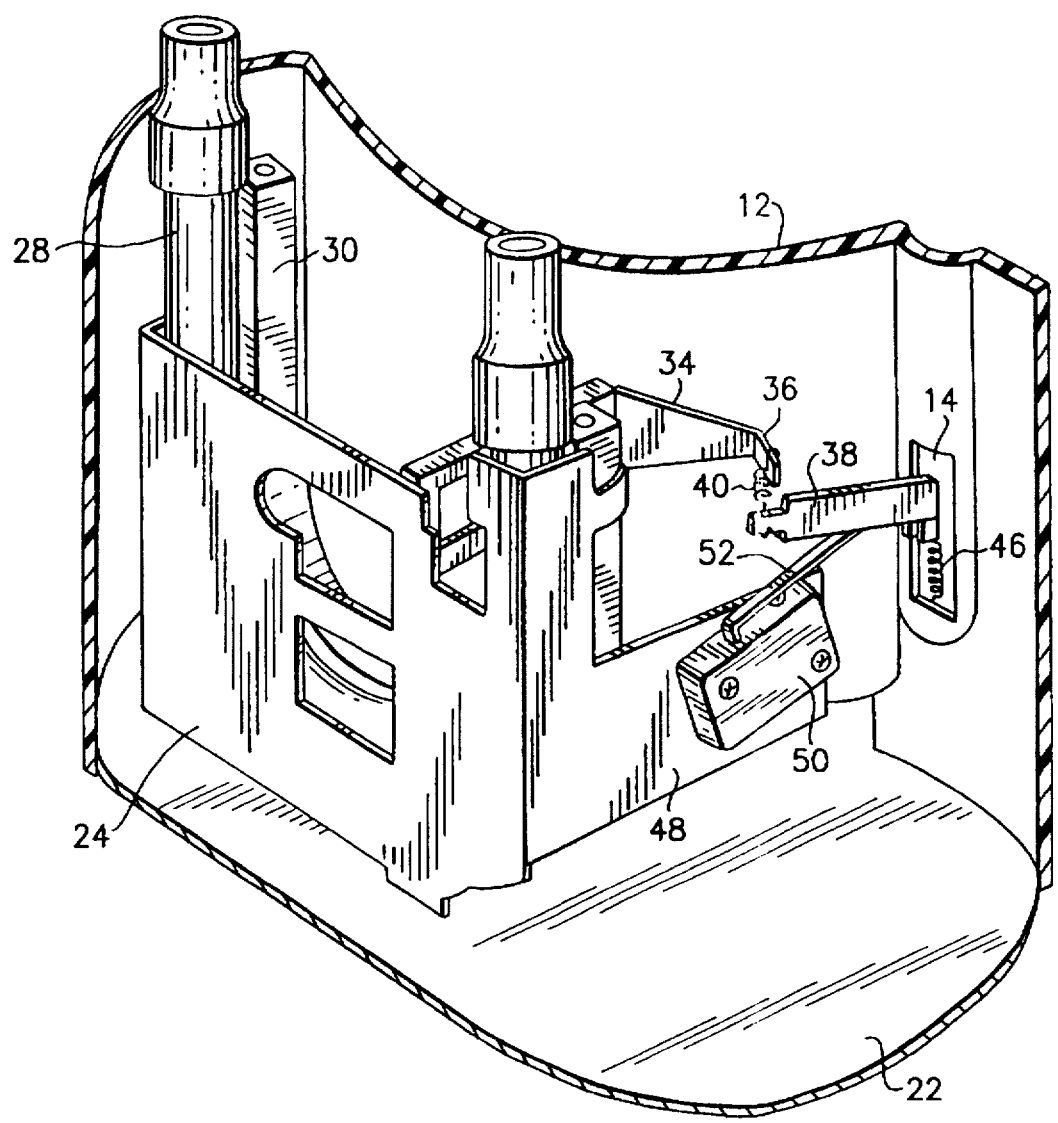
FIG. 3 is a partial perspective cut-away view of the coffee maker as shown in FIG. 2A taken from a rear, right side.

The coffee maker 10 is an electric coffee maker with a housing 12, a user actuated reset button 14, and a removable cup 16. The housing 12 includes a movable top 18 for introducing coffee grinds and water into the housing 12 for brewing coffee. Brewed coffee is delivered to the cup 16 when the cup is located in the cup receiving area 20. Referring also to FIGS. 2A and 3, located inside the housing 12 and mounted on a base 22 of the housing 12 is a first frame member 24 and a second frame member 26. Mounted on the first frame member 24 is a heater with a U-shaped water conduiting tube 28 and a U-shaped electric heating element 30. The tube 28 and the heating element 30 preferably share a common metal frame. Mounted on the tube 28 is a resettable thermostat 32. Pivotably mounted between the two frame members 24, 26 is a lever 34. The lever 34 has an end 36 that is connected to an arm 38 of the button 14 by a spring 40. The button 14 is slidingly mounted on the housing 12 and biased by a spring 46 (see FIG. 4) in an upward position. The arm 38 extends through a hole in the housing 12. A user can slide the button 14 in a downward direction to move the arm 38 in a downward direction. The thermostat 32 has a plunger 42 for resetting the thermostat. The lever 34 has an arm 44 for pushing the plunger 42. The thermostat 32 is a snap acting thermostatic switch generally known in the art.

The description of the coffee maker above is substantially identical with the Black & Decker (U.S.) Inc. catalog No. DCM20WH coffee maker with the exception of the shape of the first frame member 24 and the control system described below. The first frame member 24 includes an extended arm section 48. The first frame member 24 is preferably a one-piece metal member made of sheet metal. The arm section 48 extends in a general direction towards the button 14. Mounted on the arm section 48 is an electrical switch 50. The switch 50 has an actuator 52. The actuator 52 extends under the button arm 38. The actuator 52 is directly contacted and moved by the arm 38 when the button 14 is moved in a downward direction by a user. The switch 50 is normally in a closed position. Movement of the actuator 52, when the button 14 is moved downward, causes the switch 50 to open. The switch 50 is physically separate from the thermostat, but mechanically interlinked by the thermostat resetting mechanism.

Figure 4:
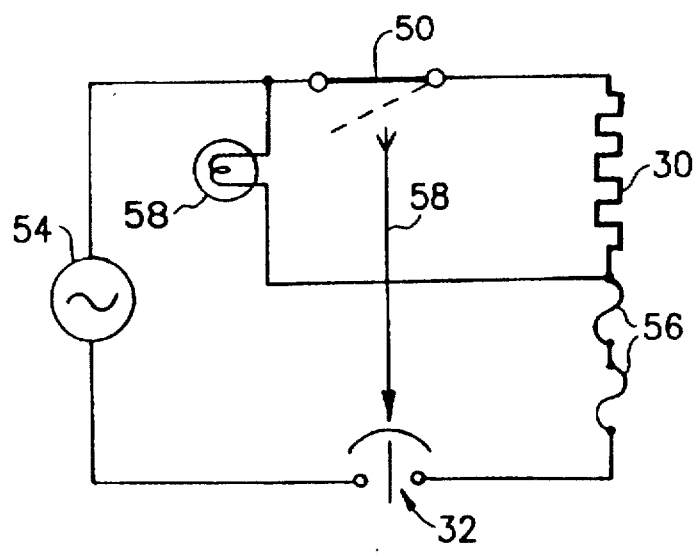
FIG. 4 is a schematic electrical diagram of the control system used in the coffee maker shown in FIG. 1.

Referring also to FIG. 4, a schematic electrical diagram of the electrical control system in the coffee maker 10 is shown. The system includes an electrical plug (not shown) that is connected to an AC power supply 54, the resettable thermostat 32, two fuses 56, the heater element 30, a lamp 58 and the normally closed switch 50. The mechanical link between movement of the switch 50 and movement of the plunger 42 of the thermostat 32 is symbolized by the arrow 58.

Figure 2B:
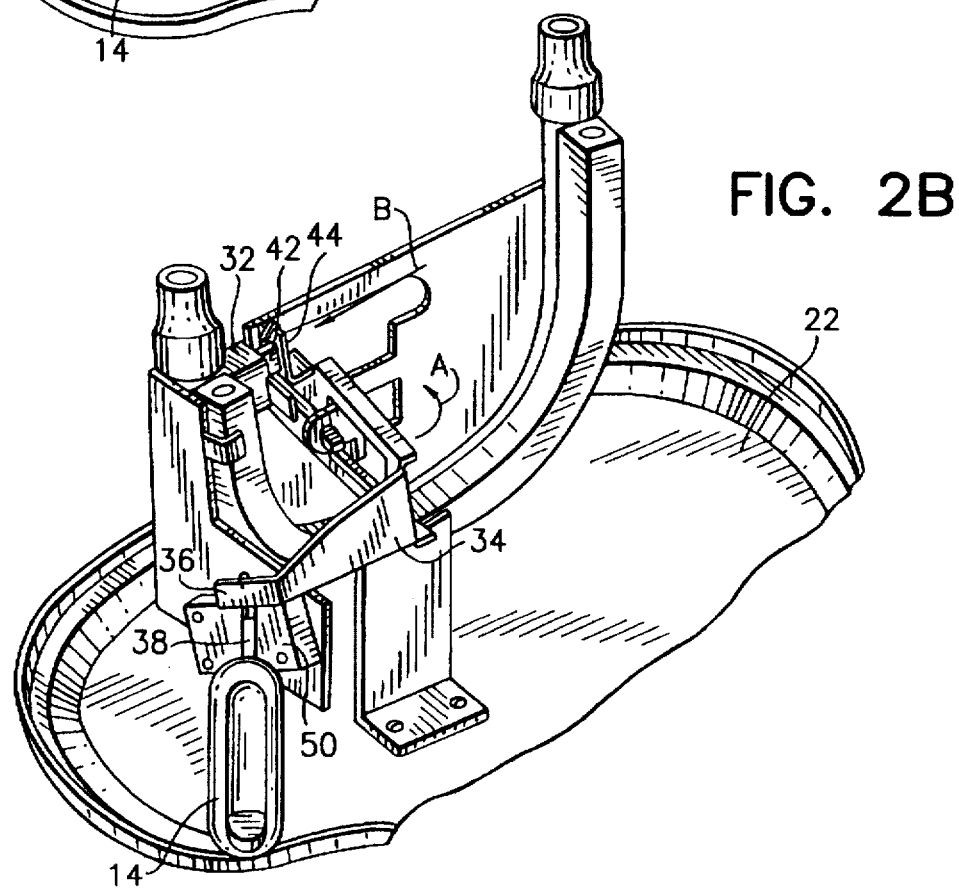
FIG. 2B is a partial perspective view as in FIG. 2A with the user actuated button at a second position.

During normal use of the coffee maker 10, to start a brewing cycle the user presses the button 14 down from the home position shown in FIGS. 1 and 2A to the thermostat reset position shown in FIG. 2B. As shown in comparing FIGS. 2A and 2B, when the arm 38 is moved down, this causes the arm 36 to pivot down. The lever 34 is thus pivoted as shown by arrow A to cause the arm 44 to push the plunger 42 inward as shown by arrow B. Inward movement of the plunger 42 resets the thermostat 32 to a closed position such that electricity can flow to the heater 30. With the thermostat closed, the brewing cycle will continue until the thermostat automatically opens. Therefore, the user can release the button 14 which is returned to its home position by the spring 46. When the actuator button 14 is released, the additional switch 50 returns to its normally closed position, and if the thermostat is cool enough to latch on, power can then flow through the heating element 30. At the end of the brewing cycle, the thermostat senses a predetermined temperature. It then snaps open to interrupt the supply of electricity to the heater 30.

In order to prevent a user from manually maintaining the thermostat in a closed position, and supplying electricity to the heater 30 even when the temperature at the thermostat would ordinarily cause the thermostat to automatically open, the switch 50 has been provided. When the user moves the button 14 to a reset position, the arm 38 causes the switch 50 to open. Therefore, when the plunger 42 is manually moved to a reset position, the switch 50 is simultaneously opened. The switch 50 is connected in electrical series with the thermostat 32 through the heating element 30. When the switch 50 is opened during reset of the thermostat 32, electricity will not flow through the heating element 30. Thus, the switch 50 and the thermostat 32 provide the same function as a trip free thermostat, but without the complicated design and manufacture of a trip free thermostat. When the user releases the button 14, if the temperature at the thermostat is too hot, the thermostat automatically snaps open again. The features of the present invention can be added to a pre-existing design by merely adding the switch 50 and providing the extended arm section 48 on the frame member.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical appliance comprising:
    a housing;
    a heater connected to the housing;
    a mechanism for resetting the thermostat, the resetting mechanism including a user actuated button movably mounted to the housing, the button being movable between a home position and a thermostat reset position; and
    a normally closed electrical switch electrically connected to the thermostat, the switch being actuated directly by the user actuated button when the button is moved towards the thermostat reset position such that the switch is moved to an open position when the thermostat is moved by the resetting mechanism to a reset position, and means for returning the button to said home position, said switch being returned to said closed position in response to the return movement of said button, electrical power being thereafter supplied to said heater as long as said thermostat remains in a closed position.

2. An appliance as in claim 1 wherein the heater is a hot water heater.

3. An appliance as in claim 1 wherein the resetting mechanism includes a lever pivotably mounted to a frame of the appliance.

4. An appliance as in claim 3 wherein the lever has an end that is connected to the button and a portion that contacts a reset plunger of the thermostat.

5. An appliance as in claim 1 wherein the switch is connected to a frame of the appliance separate from the thermostat.

6. An appliance as in claim 5 wherein the switch is electrically connected in series to the thermostat.

7. An appliance as in claim 6 wherein the switch has an actuator located under the button that is directly contacted and moved by the button.

8. An appliance as in claim 7 wherein frame includes a one-piece frame member with the heater and the switch directly mounted thereon.

9. In an electric coffee maker having a housing, a hot water heater located in the housing, a resettable thermostat connected to the heater, and a mechanism for resetting the thermostat, the resetting mechanism including a user actuated button movably mounted to the housing, wherein the improvement comprises:
    a normally closed electrical switch separate from the thermostat and electrically connected in series with the thermostat, the switch having an actuator that is moved by the user actuated button to open the switch when the button is moved by the user towards a thermostat reset position, and thereafter to close the switch when the user actuated button is moved away from said thermostat reset position to an initial position.

10. A coffee maker as in claim 9 wherein the coffee maker has a frame including a one-piece frame member, the heater and the switch being directly mounted on the frame member.

11. A coffee maker as in claim 10 wherein the resetting mechanism includes a lever pivotably mounted to the frame member.

12. A coffee maker as in claim 11 wherein one end of the lever is connected to the button and a portion of the lever contacts a reset plunger of the thermostat.

13. A coffee maker as in claim 9 wherein the actuator of the switch is located beneath a portion of the button and is directly contacted and moved by the button.

14. A method of manufacturing an electrical appliance having a hot water heater comprising steps of:
    connecting a resettable thermostat to the heater;
    attaching a mechanism to a frame of the appliance for resetting the thermostat; and
    connecting a normally closed switch to the thermostat in electrical series, the switch being connected to the frame separate from the thermostat, the switch having an actuator located to be moved by the resetting mechanism to move the switch to an open position when the resetting mechanism is moved towards a thermostat reset position, and to return the switch to said normally closed position when the resetting mechanism is moved from said thermostat reset position to an initial position.

15. A method as in claim 14 wherein the frame includes a one-piece frame member, the heater and the switch being connected directly on the frame member.

16. A method as in claim 15 wherein the step of attaching the resetting mechanism includes pivotably mounting a lever of the resetting mechanism to the frame member.

17. A method as in claim 16 wherein the step of attaching the resetting mechanism includes movably mounting a user actuated button to a housing of the appliance, the button being connected to one end of the resetting mechanism lever, and the actuator of the switch being located under a portion of the button to be contacted and moved by the button.

* * * * *